June 18, 1929.    F. C. REILLY    1,717,520
COMPRESSOR
Filed June 5, 1925
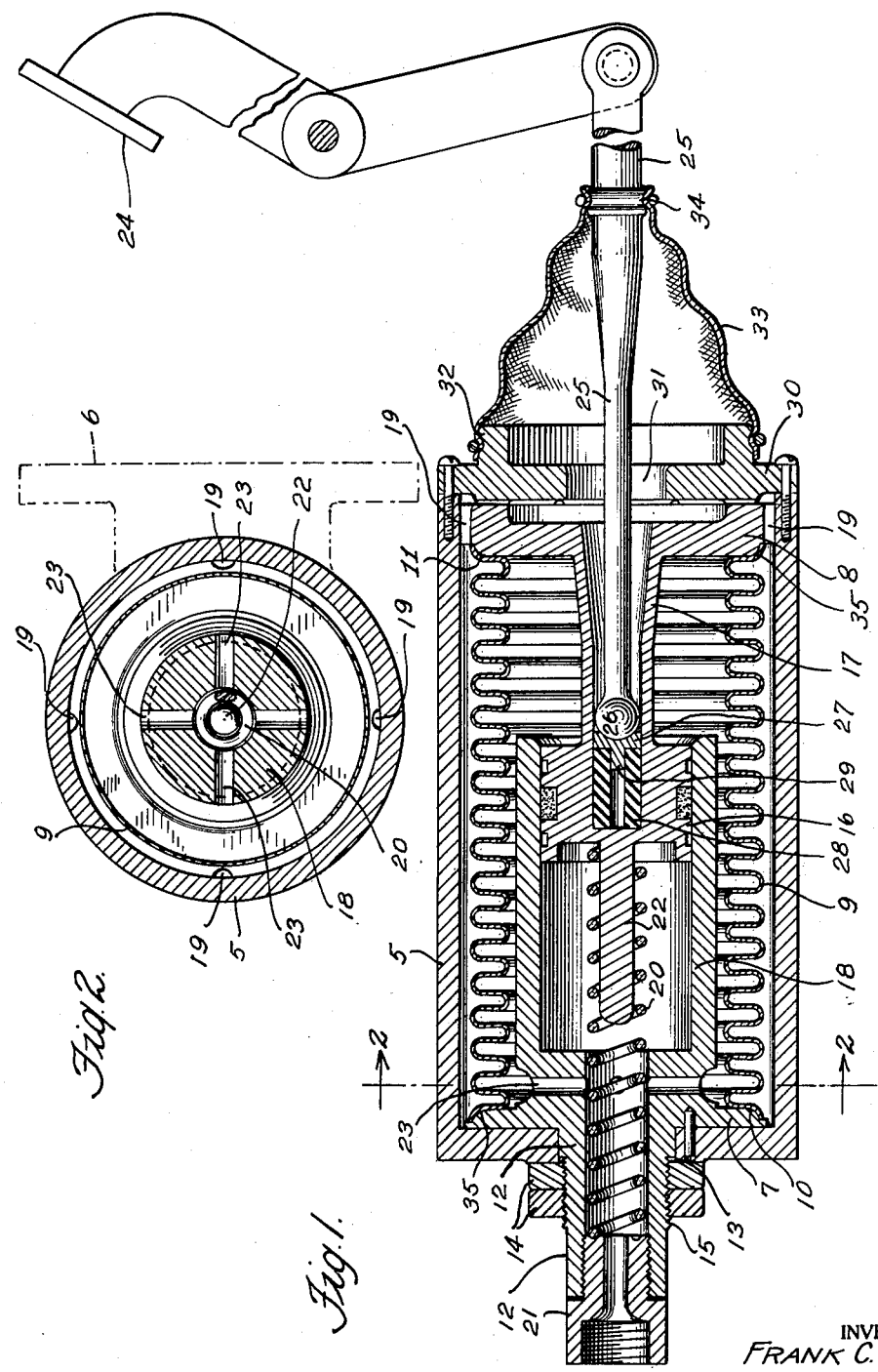
INVENTOR
FRANK C. REILLY
BY
Philip S. McLean.
ATTORNEY Patented June 18, 1929.

1,717,520

UNITED STATES PATENT OFFICE.

FRANK C. REILLY, OF NEW YORK, N. Y.

COMPRESSOR.

Application filed June 5, 1925. Serial No. 35,109.

The present invention relates particularly to compressors for creating or applying the operating power for fluid pressure brake systems of the type disclosed in my co-pending application, Serial Number 35,108, now Patent Number 1,684,743, dated September 18, 1928.

Special objects of the inventon are to provide a compressor of compact but relatively powerful design adapted for installation in a motor vehicle and arranged for convenient operation by a brake pedal or the like, of simple, sturdy design, in which the operating parts will all be properly protected and which will be proof against leakage so as to maintain a constant operating efficiency.

In the attainment of the foregoing and other desirable objects, the invention involves novel features of construction, combinations and relations of parts, including in particular a construction with relatively movable pressure heads connected in sealed relation by a flexible corrugate wall, the guiding of the relatively movable parts by internal means located within such wall and the operation of the parts by connections engaged with the positively guided portions.

Other important novel features of the invention will appear in the course of the following disclosure.

In the drawing accompanying and forming part of this specification, the invention is illustrated in only one of its many possible different forms, it being understood that the structure is susceptible of modification without departure from the broad spirit and scope of the invention as hereinafter defined and claimed.

Figure 1 is a longitudinal sectional view of the compressor coupled for operation by a foot pedal.

Figure 2 is a cross sectional view of the same as on substantially the plane of line 2—2 of Figure 1.

The body of the device illustrated comprises a substantially cylindrical housing 5 which as indicated in Figure 2 may have an offset supporting bracket 6 at one side for mounting the same in proper position upon the vehicle.

The compressible unit of the mechanism is shown as consisting of the relatively fixed and movable heads 7, 8, located within the housing and connected by a collapsible cylinder having a corrugate wall 9 secured at its opposite ends at 10 and 11 to the two pressure heads.

This unit is shown as removably secured within the housing by having an extended neck or stem 12 passed through a bearing opening 13 provided in the end of a casing and secured by nuts 14 engaged over the outer screw threaded extension 15 of such stem.

The movable head is indicated as having an easy sliding fit within the enclosing cylinder but the main guidance of this head is shown as a piston 16 connected with such head by a tubular stem 17 and operating in a guide cylinder 18 projected from the inner face of the stationary head. The movable head is shown as having ports or vents 19 in its edges to prevent it from operating as a piston within the housing cylinder.

The compressor cylinder is shown as normally expanded or extended by an expansion spring 20 engaged between the head of the guide piston and a nipple 21 screwed into the end of the tubular stem 12, said spring being positioned about a stud 22 projecting from the guide piston and operating freely in the bore of the neck. Radial ports 23 establish communication between the inside of the compression cylinder and the bore of the neck, which latter thus becomes a discharge passage for the compressed fluid.

The operation of the device is effected in the present disclosure from a brake pedal 24 by means of a pivoted push link 25 extending freely in through the tubular stem 17 and having a swiveled engagement with the guide piston by means of a ball head 26 on the inner end of the same bearing against a ball socket member 27. This ball socket is shown as cushioned against a tubular resilient member 28, seated in the guide piston and receiving a positioning stem 29 projecting from the inner face of the ball socket.

The end of the casing is shown as closed by a removable cover head 30 serving as a stop limiting the expansive movement of the pressure cylinder, said cover having a central opening 31 for the free passage of the link and a projecting collar 32 over which is secured one end of the boot 33 whose opposite end is secured to the link at 34.

The parts are so proportioned and related that an easy movement of the brake pedal will be capable of building up a relatively high pressure, the value of the pressure delivered by the compressor being dependent upon and graduated as desired by the operation of the pedal. This action is cushioned by the resilient member at the head of the push link and the easy swiveling action of the ball head prevents any binding of the parts. The flexible boot prevents water, grit or other foreign matter entering any part of the apparatus and free easy action of the movable pressure head is assured by the internal piston guide which assures free unrestricted frictionless operation of the corrugate shell. The application of the power substantially at the center of the device and directly to the guided portion of the movable element provides the most efficient application of power.

The folds of the corrugate member are usually made with substantially parallel sides connected by inner and outer semi-circular bends so as to enable uniform expansive and contractive movements throughout the length of the same. This structure avoids the setting up of definite "hinge" points so that no "wear" points are established and the action is constant and uniform. The ends of the shell are shown as secured as by brazing or soldering curved segments of the end bends over correspondingly curved beads or shoulders 35 provided on the opposed faces of the pressure heads.

The piston 16 in addition to serving as a guide, acting against the fluid prevents such sudden shiftings of the movable pressure head as might impose too great a strain upon the corrugate shell. Rupture or undue strain on this shell are thereby effectually prevented.

What is claimed is:

1. In apparatus of the character disclosed, a supporting casing open at one end and having an opening through the opposite end, a pressure unit entered through the open end of said casing and comprising a relatively stationary pressure head having a tubular stem extended through the opening in the opposite end of the casing, a relatively movable pressure head operating in the casing, a corrugate flexible wall connecting the two heads, securing means engaged with the extended portion of the tubular stem to secure the unit in place, a guide cylinder projecting from the fixed pressure head within the corrugate wall, a piston operating in said cylinder and connected with the movable head by a tubular member, a cover applied to the open end of the casing and serving as a stop for the movable head and an operating connection entered through said cover and said tubular member and having an engagement with the guide piston.

2. In apparatus of the character disclosed, a pressure unit comprising stationary and movable pressure heads, the stationary pressure head having a projecting guide cylinder on the inner face of the same and the other having an oppositely projecting tubular stem carrying a piston operating in said guide cylinder, an operating connection projecting through the tubuular stem substantially to the guide cylinder and an expansible wall connected between the pressure heads and enclosing the guide cylinder and piston.

In witness whereof, I have hereunto set my hand this 29th day of May, 1925.

FRANK C. REILLY